(12) United States Patent
Argillier et al.

(10) Patent No.: US 6,286,601 B1
(45) Date of Patent: Sep. 11, 2001

(54) PROCESS COMPRISING A REVERSIBLE FORMING COMPOSITION

(75) Inventors: Jean-François Argillier, Saint Cloud; Philippe Roche, Nanterre, both of (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/467,216

(22) Filed: Dec. 20, 1999

(30) Foreign Application Priority Data

Dec. 23, 1998 (FR) .................................................. 98 16415

(51) Int. Cl.$^7$ ............................ E21B 21/14; E21B 37/00; C09K 7/02
(52) U.S. Cl. ............................ 166/309; 166/312; 175/69; 507/102; 507/120; 507/203; 507/225; 507/925
(58) Field of Search ..................................... 166/267, 309, 166/311, 312; 175/66, 69, 71; 507/102, 119, 120, 203, 224, 225, 925

(56) References Cited

U.S. PATENT DOCUMENTS

| | | | |
|---|---|---|---|
| 3,572,440 | * | 3/1971 | Hutchison et al. ............. 166/309 X |
| 4,681,164 | * | 7/1987 | Stacks .............................. 166/309 X |
| 5,002,125 | * | 3/1991 | Phillips et al. .................. 166/309 X |
| 5,026,735 | * | 6/1991 | Stern ................................ 507/124 X |
| 5,385,206 | * | 1/1995 | Thomas ................................ 166/267 |
| 5,591,701 | * | 1/1997 | Thomas ............................ 507/203 X |
| 5,609,862 | | 3/1997 | Chen et al. . |
| 5,711,376 | * | 1/1998 | Sydansk ................................ 166/308 |
| 6,148,932 | * | 11/2000 | Argillier et al. ................. 166/312 X |

FOREIGN PATENT DOCUMENTS

| | | |
|---|---|---|
| 0371616 | 3/1993 | (EP) . |
| 2757426 | 6/1998 | (FR) . |
| 14066 | 5/1995 | (WO) . |
| 21022 | 6/1997 | (WO) . |

* cited by examiner

*Primary Examiner*—George Suchfield
(74) *Attorney, Agent, or Firm*—Antonelli, Terry, Stout & Kraus, LLP

(57) ABSTRACT

A process for circulating an aqueous foam in a wellbore includes the steps of forming a foam from an aqueous composition having a determined pH value, injecting the foam into a well so that it circulates from the surface to the well bottom and then back from the well bottom to the surface, and then changing the pH value of the foam when it returns to the surface. The aqueous composition from which the foam is made includes at least one ionic surfactant whose charge does not practically depend on the pH value and a polyampholytic polymer whose global charge depends on the pH value. This composition gives the foam the property that when the pH of the foam is varied at the surface of the well, the charge of the polyampholytic polymer is modified and the foam becomes destabilized and breaks more readily.

12 Claims, No Drawings

PROCESS COMPRISING A REVERSIBLE FORMING COMPOSITION

FIELD OF THE INVENTION

The invention relates to a process and to a system for implementing the process in underground development wells for drilling, cleaning or bringing in of these wells in the case of a producing reservoir. In the process, a foaming fluid is circulated between the ground surface, the well bottom and back to the surface from a string of pipes lowered in the well. The foam is generally injected inside the pipes and returns through the annular space defined by the outside of the pipes and the well walls. The fluid in form of foam carries the cuttings along to the surface, thus cleaning the working face. This technique, referred to as foam drilling, is well-known and notably affords the advantage of not leading to too high a bottomhole hydrostatic pressure thanks to the low density of the foam. However, the drawback of this technique is that it does not allow easy recycling of the foaming solution, considering the products initially brought into solution to stabilize the foam after stirring and gas injection. "Breaking" of the foam is thus a troublesome problem for an application where it is desired to recover most of the foaming products for repeated use, or if the environmental conditions do not allow spreading of the volume of foam back from the well.

BACKGROUND OF THE INVENTION

Document WO-94/17,154 describes using an amphoteric foaming agent combined with other surfactants as a base for a stable foaming composition. The foam is broken by suitable variation of the pH value of the foam If the foam is basic, the foam is broken by lowering the pH value to at least below 4, if the foam is acidic, the foam is broken by raising the pH value to at least above 9.5.

SUMMARY OF THE INVENTION

The present invention relates to a foam drilling process using a foaming solution consisting of a combination of at least one surfactant, cationic or anionic, used as the foaming agent, whose charge hardly depends on the pH value and of a polyampholytic polymer whose global charge depends on the pH value. The polymer according to the invention has no foaming property. For a determined pH value of the present foaming solution, the foaming function thereof is optimized by adjusting the respective quantities of ampholytic polymer and of surfactant (anionic or cationic according to the sign of the charges of the polymer under these determined pH conditions), by taking into account the respective charges of the polymer and of the surfactant. Changing the pH value of the foam thus modifies the charges of the ampholytic polymer. As a result, the interactions of the charges between the polymer and the surfactant are modified so that the foam can be destabilized and possibly even broken. It is thus possible to envisage re-using the foaming composition for a new injection.

The process and the composition according to the invention can be advantageously applied to oil well drilling, servicing or completion operations requiring a well fluid having a density below 1, such as a foam.

The polyampholytic polymers of the process or of the foaming composition according to the present invention are preferably selected from the group consisting of:

a) the polymers having the following general formula (I):

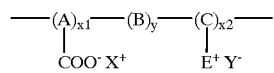

where A denotes a group resulting from copolymerization of an ethylene-unsaturated monomer and carrying an anionic group —COO⁻, $X^+$ is a cation resulting from neutralization of the anionic groups —COO⁻ by an inorganic or organic base, B is a group resulting from copolymerization of at least one hydrophilic ethylene-unsaturated monomer, preferably acrylamide, C is a group resulting from copolymerization of an ethylene-unsaturated monomer and carrying a cationic group $E^+$ such that

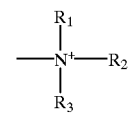

wherein R1, R2 and R3, identical or different, are hydrogen, a C1–C22 alkyl group, linear, branched or cyclic (cycloaliphatic or aromatic), Y denotes an anion resulting from neutralization of groups E by an inorganic or organic acid or from quaternization of groups E, x1, x2 and y respectively denote the percentages by moles for groups A, B and C, with x1 greater than or equal to x2, and x1+x2+y=1;

b) the betainic polymers having the following formula:

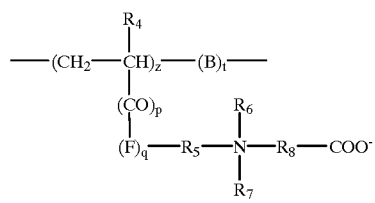

wherein R4, R6 and R7, identical or different, denote hydrogen or a C1–C4 alkyl, linear or branched, F denotes NH or O or forms, with group R5, a C5–C7 aromatic or non-aromatic cycle or heterocycle, R5 and R8 denote, independently of each other, a divalent hydrocarbon group, in particular a group —(CH2)n— with n an integer ranging from 1 to 4, R5 can form a C5–C7 heterocycle with R6 and R7, B is a group resulting from copolymerization of at least one hydrophilic ethylene-unsaturated monomer, preferably acrylamide, z and t are the percentages by moles of the groups, such that z+t=1, p is 0 or 1 and q is 1.

In the general formula (I) defined above, the monomers leading after copolymerization to units having the following structure:

are selected from the salts of carboxylic acids, linear, branched or cyclic (cycloaliphatic or aromatic), such as crotonic acid, acrylic acid, metacrylic acid, vinylbenzoic acid salts; carboxylic diacid salts such as maleic, fumaric or itaconic acid salts, as well as their monoesters and monoacids, the counterion $X^+$ associated with $COO^-$ generally results from neutralization of the group. $COO^-$ by an inorganic base such as NaOH or KOH or an organic base such as an amine or an aminoalcohol.

In general formula (I), the monomers leading to the structural units —B— are selected from the hydrophilic ethylene-unsaturated monomers and are so selected that the final polymer is water-soluble.

In general formula (I), the monomers leading to units having the following structure:

are preferably selected from acrylic, vinylic, allylic or diallylic type monomers comprising a tertiary amine function quaternized by an alkyl halide or a dialkyl sulfate.

Examples thereof are:
dimethylaminoethylacrylate,
diethylaiminoethylacrylate,
dimethylaminopropylacrylate,
dimethylaminopropylacrylamide,
2-vinylpyridine,
4-vinylpyridine,
dimethylallylamine,
quaternized by an alkyl halide or a dialkyl sulfate.

The polyampholytes of formula (I) preferably used are selected from sodium acrylate, acrylamide and acryloxyethyltrimethylamnnonium copolymers.

The molecular weights of the polyampholytes according to the invention can range from 5000 to 10,000,000 and they preferably range between 100,000 and 2,000,000.

All the conventional anionic surfactants can be used in the present invention as surfactants combined with the polyampholytic polymer, such as the anionic function, i.e.:

sulfonates:
alkylbenzene sulfonates,
paraffin sulfonates,
α-olefin sulfonates,
petroleum sulfonates,
lignosulfonates,
sulfosuccinic derivatives,
polynaphtylmethane sulfonates,
alkyltaurides,
sulfates:
  alkylsulfates,
  alkylethersulfates,
phosphates:
  monoalkyl phosphates,
  dialkyl phosphates,
phosphonates.

Examples of cationic surfactants are:
quaternary ammonium salts, whose nitrogen:
comprises a fatty chain, for example alkyltrimethyl or triethyl ammonium derivatives, alkyldimethyl benzylammonium derivatives,
comprises two fatty chains,
belongs to a heterocycle, for example pyridinium, imidazolinium, quinolinium, piperidinium, morpholinium derivatives.

Other features and advantages of the present invention will be clear from reading the description of the tests given hereafter by way of non limitative example.

DETAILED DESCRIPTNON

The tests are essentially based on the comparison of the following measurements, performed on the foaming solution or on the foam formed from said foaming solution:

the drainage rate VD that allows to characterize the stability of the foam formed, according to the pH value, the viscosity $\mu$ (mPa.s) of the foaming solution, to check that the drainage rate increase is not mainly due to a variation in the viscosity of the foaming solution.

Procedure:

The foaming solution consists of:
an AM/AA/ADAME polyampholyte, i.e. acryalmide/acrylic acid/acryl oxyethyl trimethyl ammonium chloride, at 85%, 10%, 5% by moles respectively, solubilized in water,
at least one ionic surfactant, of SDS (sodium dodecyl sulfate) or DOTAB (dodecyl tri methylammonium bromide) type.

The polyampholyte A, of lower molecular mass, is characterized by a Brookfield aviscosity of 4500 cP for a 20% solution in water, whereas the polyampholyte B, of higher mass, has a Brookfield viscosity of 8500 cP for a 20% solution in water.

The foam is obtained from 200 ml of foaming solution by stirring with a whip. The rotating speed is about 2000 rpm. VM is the volume of foam formed. In general, the stirring time is about 2 minutes, which is enough to obtain a homogeneous foam and a maximum volume.

In order to measure the drainage rate characteristic of the foam stability, the foam obtained is poured into a graduated glass funnel and the volume of solution drained is noted as a function of time. The foam stability is characterized by its drainage rate VD. The drainage rate is defmed from the empirical equation that describes the drained volume V as a function of time (Bikerman, J. J., 1973):

$$V=V_0(1-\exp(-kt))$$

V: the drained volume (cm$^3$)
V$_0$: the volume of foaming solution (cm$^3$)
t: time (min.)
VD=kV$_0$/2 (cm$^3$/min.)
T½ is the "half-life" time, i.e. the time during which a volume equal to V0/2 is drained.
A low VD value indicates that the foam is stable.

EXAMPLE 1

Influence of the pH value on the foam stability (SDS and polyampholyte A system)

The foaming solution consists of a solution of bidistilled water to which 8.3 10$^{-4}$ mol/l SDS (i.e. the critical micelle concentration CMC out of 10) and 1.28 g/l AM/AA/

ADAME polyampholyte (85/10/5, percentages by moles) are added. It can be noted that these respective concentrations approximately correspond to an identity between the negative charges carried by the surfactant and the positive charges carried by the polymer.

| pH | 2.1 | 3.1 | 6.1 | 8 | 10 | 12.3 |
|---|---|---|---|---|---|---|
| VM (ml) | 1400 | 1500 | 1600 | 1500 | 1450 | 1500 |
| VD (cm³/min) | 6.9 | 6.5 | 6.3 | 10.3 | 21 | 23.2 |

These results show that the foam is less stable at a basic pH value than at a pH value below 6. For a foam with a pH value of about 8, the pH increase (10 to 12) allows to destabilize the foanm In fact, for these values, the drainage rate is higher.

EXAMPLE 2

Influence of the surfactant concentration (SDS and polyampholyte A system)

The SDS surfactant concentration is variable and expressed in relation to the CMC concentration of $8.3 \cdot 10^{-3}$ mol/l. The polyampholyte concentration (polym C expressed in gram/litre) is calculated so as to have approximately equivalence between the negative charges carried by the surfactant and the positive charges carried by the polymer.

| Surfact. C | 1/20 | 1/20 | 1/10 | 1/10 | 1/5 | 1/5 | 1/2 | 1/2 | 1 | 1 |
|---|---|---|---|---|---|---|---|---|---|---|
| Polym. C | 0 | 0.64 | 0 | 1.28 | 0 | 2.56 | 0 | 6.40 | 0 | 12.8 |
| VM pH = 3 | 0 | 900 | 700 | 1600 | 1500 | 1700 | 1800 | 1800 | 2000 | 1700 |
| VD pH = 3 |  | 9.3 |  | 6.4 | 43 | 4.5 | 22.3 | 3.5 | 21.4 | 2.7 |
| T½ pH = 3 |  | 7.5 | <1.5 | 14.6 | 2.4 | 18.3 | 5.5 | 22.3 | 7 | 34.1 |
| VM pH = 12 | 1250 | 1000 | 1500 | 1500 | 1700 | 1650 | 1900 | 1900 | 2000 | 1800 |
| VD pH = 12 | 32.8 | 29.4 |  | 23.6 | 25.6 | 17.2 | 22.1 | 19.1 | 21.2 | 13.8 |
| T½ pH = 12 | 3.1 | 3.3 | 3.5 | 5.3 | 5.0 | 8.2 | 6.1 | 9.5 | 7.1 | 11.4 |

NB T½=3.5, for example, means 3 minutes and 50 seconds.

These results show, on the one hand, that the presence of polymer allows to form foam at pH=3 with low surfactant concentrations (1/20 CMC for example), which is not the case in the absence of a polymer. On the other hand, in the presence of polymer A, the foam is always more stable with an acidic pH value than with a basic pH value. It can be noted that, in the absence of polymer, and with surfactant concentrations greater than or equal to the CMC/2, the foam formed with the surfactant has a constant stability from pH=3 to pH=12.

EXAMPLE 3

Influence of the polymer A concentration

The SDS concentration is $8.3 \cdot 10^{-4}$ mol/l (CMC/10). The ampholytic polymer A concentration is variable and it is expressed in relation to the charge equivalence (i.e. 1.28 g/l).

| Ceq | 0 | 0.1 | 0.5 | 1 | 2 |
|---|---|---|---|---|---|
| VM pH = 3 | 700 | 1500 | 1600 | 1600 | 1600 |
| VD pH = 3 |  |  | 7.9 | 6.4 | 4.8 |
| T1/2 pH = 3 | <1 | <1 | 11.5 | 14.6 | 21.1 |
| Viscosity | 0.96 | 0.98 | 0.99 | 1.1 | 1.4 |
| VM pH = 12 | 1500 | 1600 | 1700 | 1500 | 1600 |
| VD pH = 12 | 31.8 | 27.1 | 26 | 24 | 18 |
| T1/2 pH = 12 | 3.5 | 4.2 | 4.4 | 5.3 | 7.4 |
| Viscosity | 0.97 | 1.0 | 1.1 | 1.4 | 1.6 |

(Viscosity in mPa.s)

Ceq is the polymer concentration in relation to the charge equivalence. Ceq=1 corresponds to a polymer concentration of 1.28 g/l.

It can be noted that, in the absence of polymer and with a low surfactant concentration, very little foam can be formed with our stirring conditions. The foam thus formed is hardly stable. It can also be observed that the foam is more stable at pH=3 than at pH=12 with addition of ampholytic polymer.

EXAMPLE 4

Influence of the addition of soda to a foam formed at pH=6

11.2 cm³ 0.2 N soda is added to a foam formed at pH=6, so that the pH value is in the region of 12. A comparison of the properties of the foam before and after modification of the pH value is given hereunder. The SDS concentration is $8.3 \cdot 10^{-4}$ mol/l and the polyampholyte concentration is 1.28 g/l.

| pH = 6 (initial) | | pH = 12 (after addition of soda) | |
|---|---|---|---|
| VM (ml) | 1800 | VM (ml) | 1700 |
| VD (cm³/min) | 7.1 | VD (cm³/min) | 18 |
| T1/2 (min) | 12.4 | T1/2 (min) | 5.3 |

These tests show that, in this example, addition of soda from a foam formed at pH=6 allows to destabilize the initial foam and to obtain the drainage rate of a foam formed at pH=12.

EXAMPLE 5

Case of a cationic surfactant such as DOTAB, influence of the pH value

The surfactant is DOTAB. Polyampholyte A still is the AM/AA/ADAME copolymer (85/10/5, percentages by moles). The surfactant concentration is $7.5 \cdot 10^{-3}$ mol/l, i.e. about CMC12, and the polymer concentration is 2.32 g/l, which corresponds to about one fifth of the negative charges carried by the polymer in relation to the positive charges carried by the surfactant.

|  | Pure DOTAB | DOTAB/polymer (0.2 eq) |
|---|---|---|
| T1/2 pH = 3 | 3 min. 50 s | 2 min. 50 s |
| T1/2 pH = 12 | <40 s | 9 min. 30 s |
| VD pH = 3 | 33.5 | 62 |
| VD pH = 12 |  | 10.7 |
| Vol (cm³) pH = 3 | 1600 | 1500 |
| Vol (cm³) pH = 12 | 1450 | 1500 |

These results show that, in this example, in the presence of polymer, the foam is more stable at pH=12 than at pH=3. It is the opposite case in example 1. It can also be noted that, in the absence of polymer and at this surfactant concentration, the foam is not very stable, in particular at pH=12. Lowering the pH value therefore allows to destabilize a foam formed at a basic pH value.

EXAMPLE 6

Influence of the presence of salts (polymer A)

The foaming solution consists of a solution of bidistilled water to which $8.3 \cdot 10^{-4}$ mol/l SDS (i.e. the CMC/10 concentration), possibly 1.28 g/l AM/AA/ADAME polyampholyte (85/10/5, percentages by moles) and NaCl at the given concentration are added.

| Polymer C (g/l) | 0 | 0 | 0 | 1.28 | 1.28 | 1.28 |
|---|---|---|---|---|---|---|
| NaCl C (mol/l) | 0 | 0.01 | 0.1 | 0 | 0.01 | 0.1 |
| VM pH = 3 | 700 | 1600 | 1250 | 1600 | 1600 | 1300 |
| VD pH = 3 |  | 38.1 | 25.1 | 6.4 | 6.2 | 6.3 |
| T½ pH = 3 | <1.5 | 3.1 | 3.3 | 14.6 | 15.5 | 16.1 |
| VM pH = 12 | 1500 | 1700 | 1400 | 1500 | 1500 | 1550 |
| VD pH = 12 | 31.8 | 32.3 | 25.5 | 23.6 | 31.9 | 29.4 |
| T½ pH = 12 | 3.5 | 4.1 | 4.1 | 5.3 | 4.2 | 4.1 |

NB : T½=3.5, for example, means 3 minutes and 50 seconds.

These results show that, in the presence of polymer, the foam remains more stable at pH=3 than at pH=12, even in the presence of NaCl that can reach concentrations of 0.1 mol/l.

EXAMPLE 7

Influence of the molecular mass of the polyampholyte: comparison between polymer A and polymer B

|  | Pure DOTAB | DOTAB/polymer A (0.2 eq) | DOTAB/polymer B (0.2 eq) |
|---|---|---|---|
| T½ pH = 3 | 3 min. 50 s | 2 min. 50 s | <54 s |
| T½ pH = 12 | <40 s | 9 min. 30 s | 12 min. 40 s |
| VD pH = 3 | 33.5 | 62 |  |
| VD pH = 12 |  | 10.7 | 8.1 |
| VM (cm³) pH = 3 | 1600 | 1500 | 1300 |
| VM (cm³) pH = 12 | 1450 | 1500 | 1500 |

This test has been carried out under the same conditions as example 5, whose results are given in the first two columns.

With the polymer of higher molecular mass, at pH=3, the foam is more unstable, whereas at pH=12, the foam is more stable, in comparison with the polymer of lower molecular mass.

What is claimed is:

1. A process for circulating an aqueous foam in a wellbore, wherein the following stages are carried out:

forming a foam from an aqueous composition having a determined pH value and comprising at least one ionic surfactant whose charge does practically not depend on the pH value and a polyampholytic polymer whose global charge depends on the pH value, selected from the group consisting of:

a) the polymers having the following general formula (I):

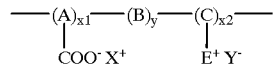

where A denotes a group resulting from copolymerization of an ethylene-unsaturated monomer and carrying an anionic group a —COO⁻, X⁺ is a cation resulting from neutralization of the anionic groups —COO⁻ by an inorganic or organic base, B is a group resulting from copolymerization of at least one hydrophilic ethylene-unsaturated monomer, preferably acrylamide, C is a group resulting from copolymerization of an ethylene-unsaturated monomer and carrying a cationic group E⁺ such that:

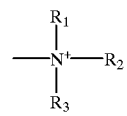

where R1, R2 and R3, identical or different, are hydrogen, a C1–C22 alkyl group, linear, branched or cyclic (cycloaliphatic or aromatic), Y⁻ denotes an anion resulting from neutralization of groups E by an inorganic or organic acid or from quaternization of groups E, x1, x2 and y respectively denote the percentages by moles for groups A, B and C, with x1 greater than or equal to x2, and x1+x2+y=1;

b) the betainic polymers having the following formula:

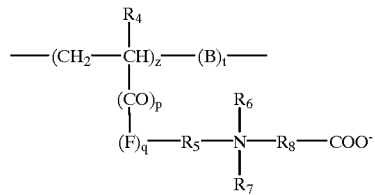

where R4, R6 and R7, identical or different, denote hydrogen or a C1–C4 alkyl, linear or branched, F denotes NH or O or forms, with group R5, a C5–C7 aromatic or non-aromatic cycle or heterocycle, R5 and R8 denote, independently of each other, a divalent hydrocarbon group, in particular a group —(CH2)n— with n an integer ranging from 1 to 4, R5 can form a C5–C7 heterocycle with R6 and R7, B is a group resulting from copolymerization of at least one hydrophilic ethylene-unsaturated monomer, preferably acrylamide, z and t are the percentages by moles of the groups, such that z+t=1, p is 0 or 1 and q is 0 or 1;

injecting said foam into the well, said foam circulating from the surface to the well bottom, and back from the bottom to the surface, changing the pH value of the foam back at the surface so as to modify the charge of the polymer in order to destabilize the foam.

2. A process as claimed in claim 1, wherein the molecular mass of said polyampholytic polymer ranges between 5000 and 10,000,000, preferably between 100,000 and 2,000,000.

3. A process as claimed in claim 1, wherein the quantity of polymer in relation to the quantity of surfactant is adjusted according to the charges carried by the polymer and the surfactant.

4. A process as claimed in claim 1, wherein the polymer is AM/AA/ADAME.

5. A process as claimed in claim 1, wherein the surfactant is selected from the group consisting of SDS and DOTAB.

6. A process as claimed in claim 4, wherein the AM/AA/ADAME polymer is respectively at 85%, 10% and 5% by moles.

7. The process of claim 1 wherein the foam density is less than 1.

8. The process of claim 2 wherein the foam density is less than 1.

9. The process of claim 3 wherein the foam density is less than 1.

10. The process of claim 4 wherein the foam density is less than 1.

11. The process of claim 5 wherein the foam density is less than 1.

12. The process of claim 6 wherein the foam density is less than 1.

* * * * *